United States Patent
Warren

(10) Patent No.: US 9,032,517 B2
(45) Date of Patent: May 12, 2015

(54) MALICIOUS CODE DETECTION

(75) Inventor: David A. Warren, El Dorado Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 265 days.

(21) Appl. No.: 13/259,307

(22) PCT Filed: Oct. 31, 2009

(86) PCT No.: PCT/US2009/062899
§ 371 (c)(1),
(2), (4) Date: Sep. 23, 2011

(87) PCT Pub. No.: WO2011/053324
PCT Pub. Date: May 5, 2011

(65) Prior Publication Data
US 2012/0023578 A1  Jan. 26, 2012

(51) Int. Cl.
*G06F 11/00* (2006.01)
*H04L 29/06* (2006.01)
*G06F 21/56* (2013.01)

(52) U.S. Cl.
CPC .......... *H04L 63/1416* (2013.01); *G06F 21/564* (2013.01)

(58) Field of Classification Search
CPC . H04L 63/14; H04L 63/1408; H04L 63/1416; H04L 63/1425; H04L 29/06877; H04L 29/06884; H04L 29/06891; H04L 29/06897; H04L 29/06911; H04L 29/06918
See application file for complete search history.

(56) References Cited

U.S. PATENT DOCUMENTS

| | | | |
|---|---|---|---|
| 5,452,442 A * | 9/1995 | Kephart | 714/38.1 |
| 7,181,613 B2 | 2/2007 | Boebert et al. | |
| 7,367,057 B2 | 4/2008 | Das et al. | |
| 2003/0172292 A1* | 9/2003 | Judge | 713/200 |
| 2004/0151382 A1* | 8/2004 | Stellenberg et al. | 382/219 |
| 2005/0086520 A1* | 4/2005 | Dharmapurikar et al. | 713/201 |
| 2005/0108573 A1* | 5/2005 | Bennett et al. | 713/201 |
| 2005/0283838 A1* | 12/2005 | Saito | 726/24 |
| 2006/0053295 A1 | 3/2006 | Madhusudan et al. | |
| 2006/0098652 A1* | 5/2006 | Singh et al. | 370/389 |
| 2006/0242686 A1* | 10/2006 | Toda et al. | 726/3 |
| 2006/0253903 A1* | 11/2006 | Krumel | 726/13 |
| 2007/0058540 A1* | 3/2007 | Kay | 370/230 |
| 2008/0034350 A1 | 2/2008 | Conti | |

(Continued)

FOREIGN PATENT DOCUMENTS

| | | |
|---|---|---|
| CN | 101031876 | 9/2007 |
| CN | 101266682 | 9/2008 |

OTHER PUBLICATIONS

ISR/WO, PCT/US2009/062899, Jul. 2, 2010.

*Primary Examiner* — Darren B Schwartz
(74) *Attorney, Agent, or Firm* — Law Firm of Michael A Dryja

(57) ABSTRACT

A device includes a pipeline and a detector that are both implemented at least in hardware. Data is moved through the pipeline to perform processing of the data unrelated to detection of malicious code. The detector detects the malicious code within the data as the data is moved through the pipeline, in parallel with the processing of the data as the data is moved through the pipeline. The detector detects the malicious code within the data as the data is moved through the pipeline without delaying movement of the data into, through, and out of the pipeline.

14 Claims, 4 Drawing Sheets

(56) References Cited

U.S. PATENT DOCUMENTS

| | | | |
|---|---|---|---|
| 2008/0047008 A1* | 2/2008 | Cho et al. | 726/22 |
| 2008/0134333 A1* | 6/2008 | Shipp | 726/23 |
| 2008/0172739 A1* | 7/2008 | Nakae et al. | 726/22 |
| 2009/0217369 A1* | 8/2009 | Abeni et al. | 726/13 |
| 2009/0293114 A1* | 11/2009 | Mustafa | 726/13 |
| 2010/0174929 A1* | 7/2010 | Pawlowski | 713/320 |
| 2010/0175130 A1* | 7/2010 | Pawlowski | 726/22 |

* cited by examiner

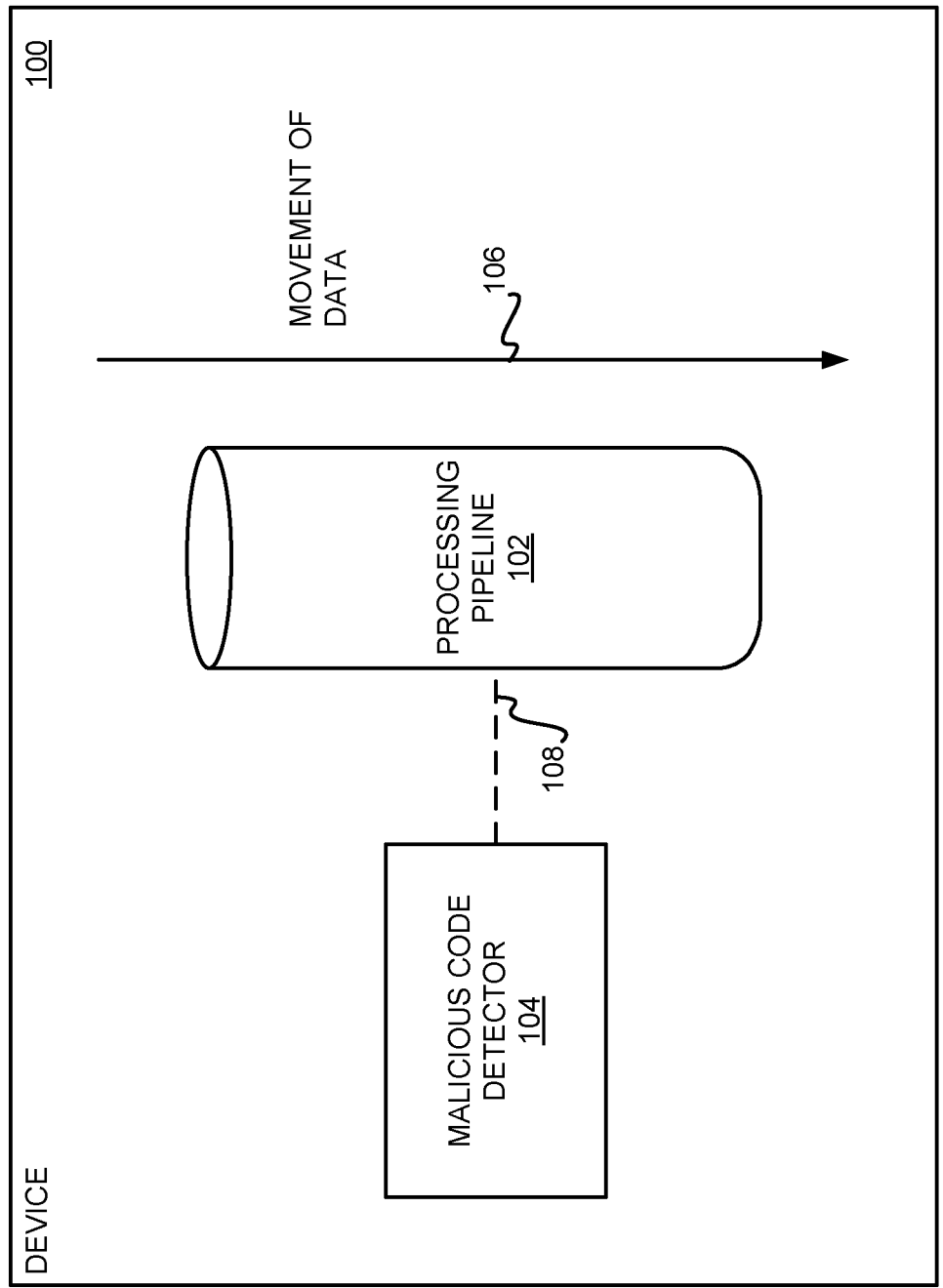

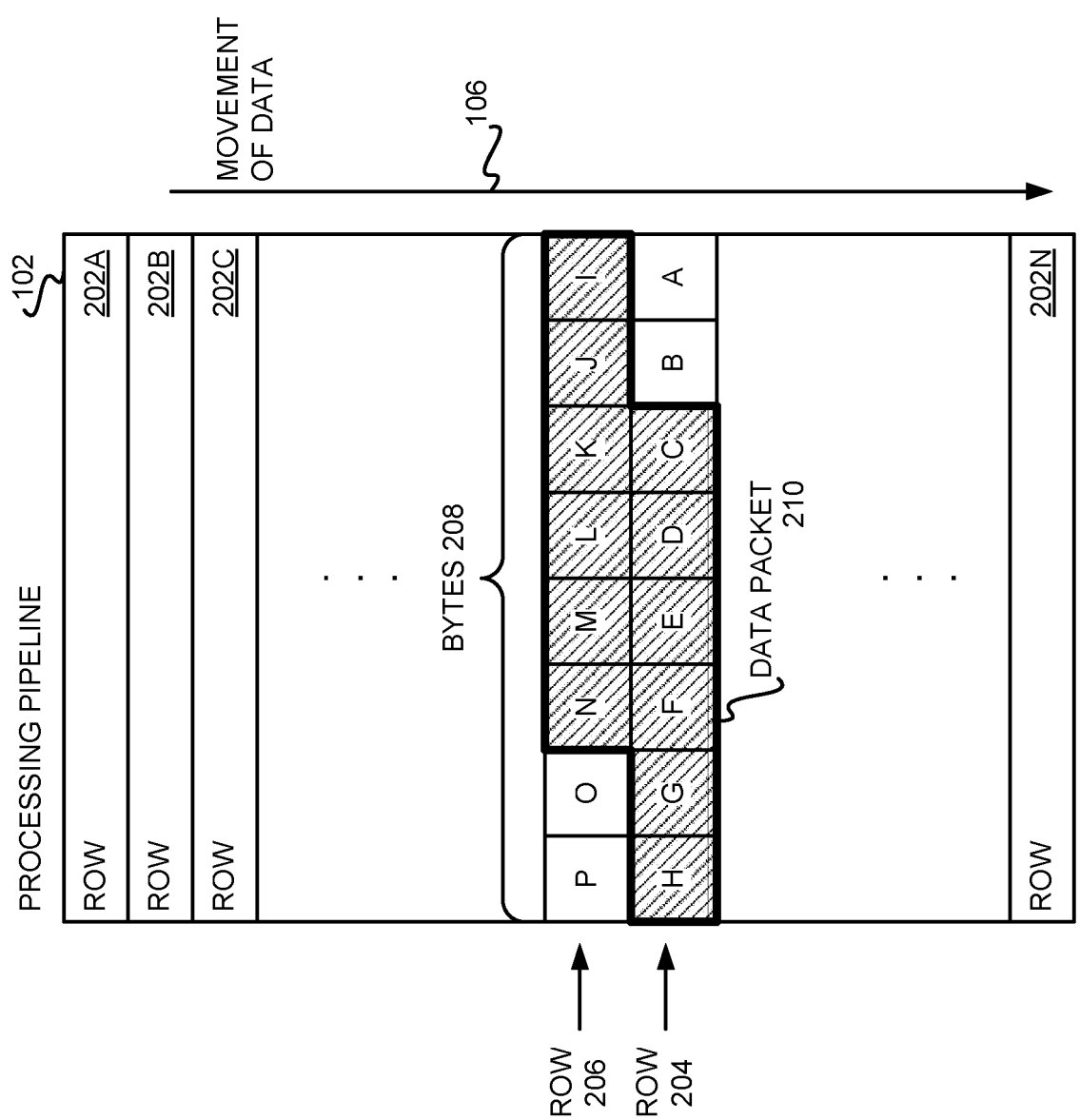

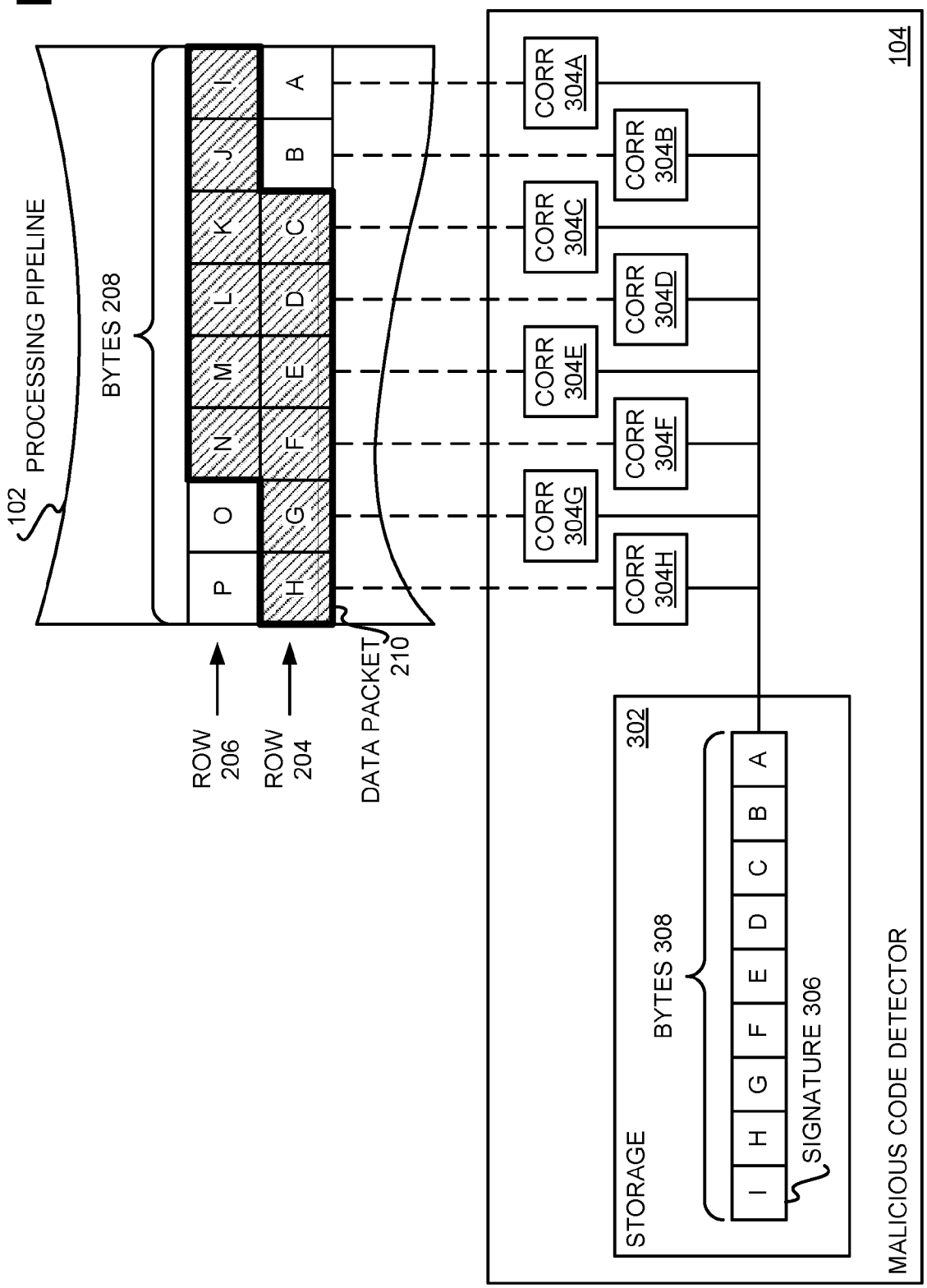

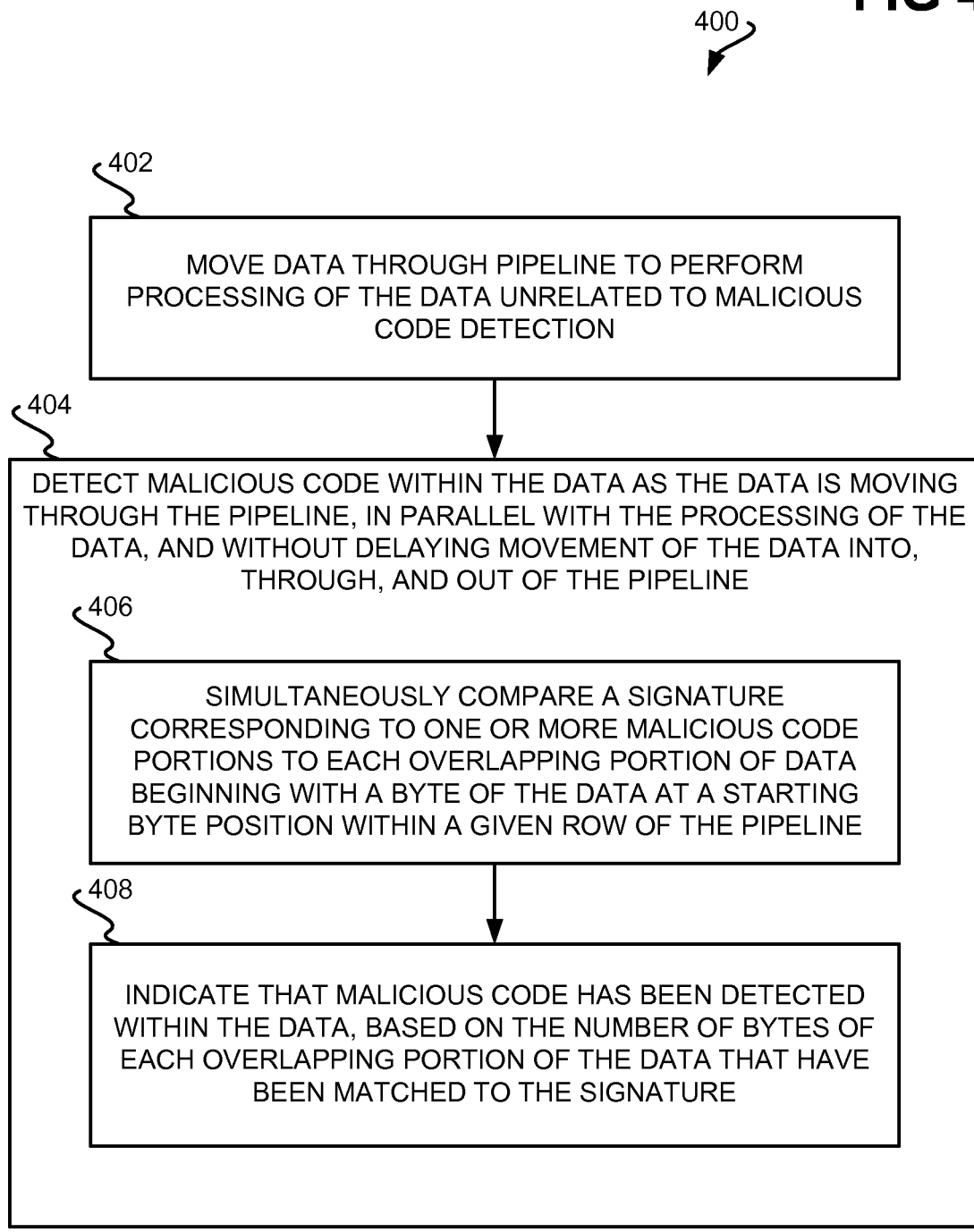

MALICIOUS CODE DETECTION

BACKGROUND

With the advent of networking technologies and the Internet, computing devices worldwide have been able to intercommunicate with one another. While this has provided numerous benefits, there have been some problems. One problem is that malicious computer code, such as computer viruses, Trojans, worms, and even spam, among other types of malicious computer code, can more easily and undesirably spread over a large number of computing devices. Malicious computer code can also be referred to in shortened form as malicious code or malware. Malicious code may generally be considered as software that is designed to infiltrate a computing device without the informed consent of the device's owner or administrator. Malware in particular is a general term used by computer professionals to mean a variety of forms of hostile, intrusive, annoying, and/or unwanted software or program code.

BRIEF DESCRIPTION OF THE DRAWINGS

FIG. 1 is a diagram of a device in which malicious code detection is performed, according to an embodiment of the present disclosure.

FIG. 2 is a diagram of the processing pipeline of the device of FIG. 1 in detail, according to an embodiment of the present disclosure.

FIG. 3 is a diagram of a malicious code detector of the device of FIG. 1 in detail, according to an embodiment of the present disclosure.

FIG. 4 is a flowchart of a method for malicious code detection, according to an embodiment of the present disclosure.

DETAILED DESCRIPTION

As noted in the background section, the spread of malicious code has become problematic with the increasing interconnectedness of computing devices over the Internet and other networks. As a result, users and network administrators are often concerned with detecting such malicious code before the code can be installed on or otherwise infect a given computing device or computing devices. For large organizations, it can be beneficial to attempt malicious code detection at the points of entry of their networks to the outside world (e.g., the Internet), in addition to or in lieu of trying to detect malicious code individually at each computing device within the organizations.

Existing techniques to detect malicious code suffer from some disadvantages, however. In one prior art approach, an existing processor of a networking device such as a switch or a router, a computing device like a general purpose computer, or another type of device, is also burdened with having to detect malicious code. As such, the other tasks of the processor may be completed more slowly. Overall performance of such a device, in other words, is lowered.

In another prior art approach, a dedicated processor is added to a network device, a computing device, or another type of device for the primary if not sole purpose of detecting malicious code detection. However, adding dedicated processors is expensive, and typically results in higher energy consumption by the devices. Furthermore, adding a dedicated processor may still not alleviate the concern of reducing the performance of a device in completing other tasks.

For example, incoming data to a device may be temporarily stored within a queue. Before this data can be processed by the device in accordance with its existing tasks, the data is first scanned for malicious code. The data cannot be processed in accordance with the existing tasks of the device until this malicious code detection has occurred. Therefore, even if a dedicated processor is employed to perform malicious code detection, overall performance of the device may suffer.

FIG. 1 shows a representative device 100, according to an embodiment of the disclosure, which overcomes these shortcomings. The device 100 may be a networking device, such as a switch, router, or other type of networking device. The device 100 may alternatively or additionally be a computing device, like a general purpose computer such as a server computing device, a client computing device, a desktop computer, and/or a laptop computer, among other types of computing devices.

The device 100 includes a processing pipeline 102 and a malicious code detector 104. Both the pipeline 102 and the detector 104 are implemented at least in hardware. In one embodiment, the pipeline 102 and the detector 104 are both implemented solely in hardware, such as by using appropriate application-specific integrated circuits (ASIC's), field-programmable gate arrays (FPGA's), and other types of hardware-only components. In another embodiment, the pipeline 102 and the detector 104 may be implemented at least in hardware in so far as they are also software that is executed by a processor (which is hardware) to perform their respective functionalities.

To process data within the device 100, the data is moved through the pipeline 102, as indicated by the arrow 106. This processing is unrelated to the detection of malicious code. That is, the purpose of moving the data through the pipeline 102 to perform processing on the data is unrelated to the detection of malicious code. The processing is performed on the data as it is moved through the pipeline 102 in that the data is altered by a processing agent executed within the pipeline 102, which may control the rate at which the data moves through the pipeline 102.

For example, where the device 100 is a networking device like a switch or router, the data may be incoming data packets received from outside a network to which the device 100 is a gatekeeper. The pipeline 102 may be used to modify the header information of these data packets so that the packets are transmitted to the proper devices within the network. For instance, data packets relating to world-wide web (WWW) requests may be transmitted to a WWW server device on the network, data packets relating to file transport protocol (FTP) requests may be transmitted to an FTP server device on the network, and so on.

External devices on the network can thus view the network as having a single networking address, whereas in actuality the network is made up of a number of devices having corresponding (internal) network addresses. The pipeline 102 is therefore used in this example to alter the networking addresses of incoming data packets to the internal network addresses of the devices on the network that are to handle the data packets. The modification of the networking addresses of incoming data packets to the internal network addresses is one type of processing that can be performed on these data packets within the pipeline 102.

However, in parallel with the processing of the data as the data is moved through the pipeline 102, the detector 104 detects any malicious code within the data as the data is moved through the pipeline 102, as indicated by the dotted line 108. The detector 104 is able to detect malicious code within the data as the data is moved through the pipeline 102, without delaying the movement of the data into, through, and out of the pipeline 102. The data processing that is performed in the pipeline 102 is independent of the malicious code detection performed by the detector 104. Data enters, moves through, and exits the pipeline 102 without waiting for the detector 104 to perform its detection.

In this respect, the embodiment of FIG. 1 is able to detect malicious code without reducing the overall performance of a device like the device 100. Furthermore, the embodiment of FIG. 1 does not require potentially expensive and power-hungry dedicated processors for malicious code detection. Rather, the detector 104 can be implemented in hardware via much lower cost hardware components that consume much less power, as compared to dedicated processors.

An additional benefit of the embodiment of FIG. 1 is that in at least some situations, all data that enters the device 100 is moved through the pipeline 102 for processing, such that the detector 104 detects malicious code within all this data. In many types of conventional techniques, by comparison, data is spot checked (i.e., randomly or selectively sampled) for the presence of malicious code. While such data sampling can be sufficiently sophisticated to more than likely catch all malicious code present within the data, it can never guarantee that all malicious code will be detected, since not all the data entering the device 100 is examined.

FIG. 2 shows the processing pipeline 102 in more detail, according to an embodiment of the disclosure. The pipeline 102 includes a number of rows 202A, 202B, 202C, . . . , 202N, collectively referred to as the rows 202. The rows 202 may also be referred to as the stages of the pipeline 102. The row 202A is the first row of the pipeline 102, and the row 202N is the last row of the pipeline 102. Each row 202 of the pipeline 102 stores the same number of bytes. For exemplary purposes, each row 202 stores eight bytes. However, each row 202 may store a different number of bytes, such as sixteen bytes, thirty-two bytes, and so on.

A number of bytes of the data equal to the number of bytes that each row 202 can store enters the pipeline 102 at the first row 202A, and proceeds through the pipeline 102 on a row-by-row basis until the data exits the last row 202N, as indicated by the arrow 106. For example, the first eight bytes of data enters the pipeline 102 at the first row 202A. These first eight bytes of data then cascade down to the second row 202B, and at the same time the second eight bytes of data enter the pipeline 102 at the first row 202A. Next, the first eight bytes of data move down to the third row 202C, the second eight bytes move down to the second row 202B, and the third eight bytes of data enter the pipeline at the first row 202A. This process continues, until the first eight bytes of data enter and then exit the last row 202N of the pipeline 102, followed by the second eight bytes entering and then exiting the last row 202N, and so on.

At any given row 202 of the pipeline 102, the data may be altered, or processed. For example, as noted above, the header information of a data packet may be altered where the processing pipeline 102 is part of a gatekeeper networking device 100. For instance, the networking address A.B.C.D may be replaced with the networking address E.F.G.H. The networking address A.B.C.D specifies the external networking address of the network as a whole of which the device 100 is a part. The networking address E.F.G.H specifies the internal networking address of the device within the network that is to handle the data packet in question.

Two particular rows 204 and 206 of the rows 202 are explicitly called out in FIG. 2, in relation to which the detection of malicious code by the detector 104 will be described. The row 204 includes bytes 208A, 208B, 208C, 208D, 208E, 208F, 208G, and 208H, starting with the byte 208A and ending with the byte 208H. The row 204 includes bytes 208I, 208J, 208K, 208L, 208M, 208N, 208O, and 208P, starting with the byte 208I and ending with the byte 208P. In a rudimentary example, a data packet 210 is said to be made up of twelve bytes 208C-208N, which is indicated in FIG. 2 by shading. It is noted that, in actuality, a data packet is more likely to be made up of a larger number of bytes in at least some situations.

The explicit calling out of the rows 204 and 206 and of the data packet 210 in FIG. 2 illustrates two aspects of data packets vis-à-vis the rows 202 of the pipeline 102. First, a data packet can span more than one row. The exemplary data packet 210, for instance, spans the rows 204 and 206. Second, a data packet does not have to start at the first byte of a row, nor end at the last byte of a row. The exemplary data packet 210, for instance, starts at the third byte 208C of the row 204, and ends at the sixth byte 208N of the row 206. The second byte 208B of the row 204 may be the ending byte of the previous data packet, and the seventh byte 208O of the row 206 may be the starting byte of the next data packet.

FIG. 3 shows the malicious code detector 104 in more detail, according to an embodiment of the disclosure. Furthermore, how the detector 104 can representatively detect malicious code in the data packet 210 spanning the rows 204 and 206 of the processing pipeline 102 is described in relation to FIG. 2. The detector 104 includes a storage 302 and correlators 304A, 304B, 304C, 304D, 304E, 304F, 304G, and 304H, which are collectively referred to as the correlators 304.

The storage 302 stores a signature 306 having a length of bytes 308A, 308B, 308C, 308D, 308E, 308F, 308G, 308H, and 308I, which are collectively referred to as the bytes 308. The number of bytes 308 of the signature 306 is independent of the number of bytes in each row 202 of the pipeline 102. There are nine bytes 308 in the example of FIG. 3, but in actuality there can be more or less of such bytes 308. The signature 306 corresponds to one or more malicious code portions. A malicious code portion is a portion of malicious code that is sufficient to identify this malicious code with a predetermined degree of confidence. For example, where the signature 306 corresponds to one malicious code portion having the bytes 308, if all the bytes 308 are found within the data in the same sequence and with the same values, then this means that the data contains the malicious code having this malicious code portion with the predetermined degree of confidence.

The correlators 304 are equal in number to the number of bytes in each row 202 of the pipeline 102. Therefore, in the example of FIG. 3, there are eight correlators 304, because there are eight bytes in each row 202 of the pipeline 102. The correlators 304 each detect whether the malicious code portions of the signature 306 are present within the data beginning in the row 204, but at different starting byte positions within the row 204. That is, the correlators 304A through 304H have starting byte positions corresponding to the positions of the bytes 208A through 208H within the row, and thus have unique offsets of zero through seven, respectively.

For example, the correlator 304A has an offset of zero and thus a starting byte position corresponding to the byte 208A of the row 204. Therefore, the correlator 304A detects whether the bytes 308A through 308I of the signature 306 match the bytes 208A through 208I of the rows 204 and 206, where the bytes 208A through 208H are in the row 204 and the byte 208I is in the row 206. That is, the correlator 304A detects whether the byte 308A matches the byte 208A, whether the byte 308B matches the byte 208B, and so on, through whether the byte 308I matches the byte 208I.

By comparison, the correlator 304B has an offset of one and thus a starting byte position corresponding to the byte 208B of the row 204. Therefore, the correlator detects whether the bytes 308A through 308I of the signature 306 match the bytes 208B through 208J. That is, the correlator 304B detects whether the byte 308A matches the byte 208B, whether the byte 308B matches the byte 208C, and so on, through whether the byte 308I matches the byte 208J. As such, whereas the correlator 304A determines whether the bytes 308 of the signature 306 are present within the rows 204 and 206 starting at the byte 208A, the correlator 304B determines whether the bytes 308 are present within the rows 204 and 206 starting at the byte 208B. Similarly, the correlator 304C has an offset of two and so determines whether the bytes 308 are present starting at the byte 208C, the correlator 304D has an offset of three and determines whether the bytes 308 are present starting at the byte 208D, and so on.

Because the number of the correlators 304 is equal to the number of bytes in each row 202 of the pipeline 102, the correlators 304 can detect whether the bytes 308 of the signature 306 are present in a corresponding sequence of bytes in the rows 204 and 206 (i.e., in the same order and with the same values), regardless of where the sequence starts within the row 204. If the sequence of the bytes 308 starts at the byte 208A in the row 204, then the correlator 304A detects the signature 306, and if the sequence of the bytes 308 starts at the byte 208B in the row 204, then the correlator 304B detects the signature 306. Similarly, if the sequence of the bytes 308 starts at a given byte 208C through 208H in the row 204, then the correlator 304C through 308H having a starting byte position corresponding to this byte in the row 204 detects the signature 306.

In the example of FIG. 3, each correlator 304 detects whether the malicious code portions of the signature 306 are present within the data as that data spans both the rows 204 and 206 of the pipeline 102. However, in general, depending on the number of bytes 308 within the signature 306 and the number of bytes within each row 202 of the pipeline 102, there may be no correlator that spans more than one row 202 of the pipeline 102. Alternatively, there may be one or more correlators that span two rows 202, or more than two rows 202, of the pipeline 102.

Each correlator 308 provides the number of bytes of the data that it has matched to the signature 306, and the detector 104 indicates that malicious code has been detected within the data based on this number of bytes of the data that have been matched to the signature 306. For example, in one embodiment, only if a given correlator 308 matches all the bytes of the signature 306 to corresponding bytes of the data does the detector 104 indicate that malicious code has been detected. As other examples, and in other embodiments, a programmable threshold number of bytes, or a threshold percentage of the number of bytes matched in relation to the total number of bytes 308 within the signature 306, may be employed to decide whether to indicate that malicious code has been detected.

As noted above, the signature 306 may correspond to one or more malicious code portions. Each code portion may correspond to a different type of malicious code, however. For example, the bytes 308A through 308D may correspond to a first type of malicious code, and the bytes 308E through 308I may correspond to a second type of malicious code. The correlators 304 can thus simultaneously detect whether either or both types of malicious code are present within the data. For example, the correlator 304E may detect that the bytes 308A through 308D of the signature 306 match the bytes 208E through 208H of the data, but that the bytes 308E through 308I do not match the bytes 208I through 208M. In such instance, the detector 104 concludes that the first type of malicious code having the malicious code portion of the bytes 308A through 308D is present within the data, but that the second type of malicious code having the malicious code portion of the bytes 308E through 308I is not.

Different malicious code portions may also be stored in the storage 302 as the signature 306 at different times. As such, the correlators 304 can detect different malicious code portions within the data moving through the pipeline 102 at different times. This may be useful where there is a large number of malicious code portions against which to test the data, and where if one packet of data is infected with a given type of malicious code, it is likely that other packets of data are infected with the same type of malicious code. However, if it is known a priori that a given type of malicious code is more dangerous or more prevalent at any given time, the malicious code portion corresponding to this type of malicious code may be retained within a portion of the signature 306, while at the same time other malicious code portions corresponding to other types of malicious code are rotated through other portions of the signature 306.

Each byte 308 may correspond to one of two different types of bytes. The first type of byte is an actual malicious code byte having a specific value to be detected within the data by the correlators 304 in relation to the other bytes 308. The second type of byte, however, is a do-not-care byte. The identity of the corresponding byte within the data does not matter for a do-not-care byte, and is unimportant for the detection of malicious code within the data.

For example, it may be known that a given type of malicious code has a malicious code section including a byte of particular value A, followed two bytes down by a byte of particular value B. The byte in between the bytes having the values A and B is of no consequence, however, and is unimportant to the detection of this type of malicious code. Therefore, the corresponding byte 308 of the signature 306 is set as a do-not-care byte, to indicate to the correlators 304 that this byte is not actually used to detect the malicious code within the data. A do-not-care byte, in other words, is a placeholder byte to specify the separation of other bytes that are important in detecting malicious code within the data.

In one embodiment, the bytes 308 for each malicious code portion within the signature 306 may have to be present within the same data packet of the data in the processing pipeline 102. In the example of FIG. 3, if the bytes 308A through 308D correspond to a given malicious code portion, then just the correlators 304C through 304H are able to detect this malicious code portion in such a situation, and not the correlators 304A and 304B. This is because the correlators 304A and 304D as to the four bytes 308A through 308D span two data packets, and not just the data packet 210. By comparison, the correlators 304C through 304H span just the data packet 210.

The particular row 202 of the pipeline 102 in relation to which the correlators 304 detect malicious code—such as the row 204 in the example of FIG. 3—is relatively unimportant, with at least one caveat. This caveat is that the row 202 in relation to which the correlators 304 has to be sufficiently down the pipeline 102 so that there is a corresponding number of bytes within that row and within any preceding rows equal to or greater than the number of bytes 308 within the signature 306. For example, the first row 202A could not have been selected in the example of FIG. 3 instead of the row 204, because there are nine bytes 308 within the signature 306, whereas there are just eight bytes in the first row 202A, and there is no preceding row to the first 202A.

The comparison performed by the correlators 304 is relatively fast, because each correlator 304 just has to compare the data beginning at a corresponding starting byte position within the row 204 to the bytes 308 of the signature 306. For example, one implementation of the correlators 304 may be a number of comparators equal to the total number of bits (as opposed to bytes) of the signature 306. Therefore, although the detector 104 does not have the ability to delay movement of data through the pipeline 102 down the rows 202, this is not a hindrance to implementation, because the comparisons can be made quickly. Comparators are also relatively inexpensive hardware components to implement, particularly as compared to dedicated processors.

In conclusion, FIG. 4 shows a method 400 for performing malicious code detection consistent with the description provided in relation to FIGS. 1-3, according to an embodiment of the disclosure. Data is moved through the processing pipeline 102 to perform processing of the data (402), where such processing is unrelated to the detection of malicious code. However, the malicious code detector 104, which is a hardware component of the device 100, detects malicious code within the data as the data is moving through the pipeline 102 (404). As noted above, such detection is performed in parallel with the processing of the data, and does not delay the movement of the data into, through, and out of the pipeline 102.

Malicious code detection is performed as follows. The method 400 simultaneously compares the signature 306, which corresponds to one or more malicious code portions, to each of a number of overlapping portions of the data beginning with a byte of the data at a starting byte position within a given row 202 of the pipeline 102 (406). In the example of FIGS. 2 and 3, for instance, the given row 202 is the row 204, and the starting byte positions correspond to the bytes 208A through 208H of the row 204. Because there are nine bytes within the signature 306 in this example, the overlapping portions of the data are the bytes 208A through 208I of the data, the bytes 208B through 208J, the bytes 208C through 208K, and so on, where the last overlapping portion of the data includes the bytes 208H through 208P.

Next, the method 400 indicates that malicious code has been detected within the data, based on the number of bytes of each overlapping portion of the data that have been matched to the signature (408). For instance, in a rudimentary example, if the signature 306 perfectly matches any of the overlapping portions of the data within the pipeline 102 beginning at a starting byte position within the row 204 (viz., all the bytes 308 match corresponding bytes within the data in the same sequence as the bytes 308), then the method 400 indicates that malicious code has been detected. However, if the signature 306 does not perfectly match any of the overlapping portions of the data within the pipeline 102 beginning at a starting byte position within the row 204, then in this example the method 400 does not indicate that malicious code has been detected.

I claim:

1. A device comprising:
   a pipeline implemented at least in hardware, wherein the pipeline includes a plurality of rows to store incoming data, and wherein the data is moved from one row to another row in the pipeline; and
   a detector implemented at least in the hardware, to detect malicious code within the data as the data is moved through the pipeline, wherein the detection of the malicious code by the detector is in parallel with a processing of the data as the data is moved through the pipeline, wherein the detector includes
      a storage to store a signature corresponding to at least one portion of the malicious code, wherein the signature includes a number of bytes greater than a total number of bytes in each row of the pipeline, and
      a plurality of correlators to compare the signature to the data in the pipeline to detect the malicious code within the data,
   wherein the plurality of correlators are equal in number to the total number of bytes in each row of the pipeline, each correlator having an offset to detect the signature beginning at a different starting byte position within a given row of the pipeline, and
   wherein each time one of the plurality of correlators compares the signature to the data in the pipeline, the correlator is to compare the signature to the data that spans more than one row of the pipeline.

2. The device of claim 1, wherein each row of the pipeline is to store a same number of bytes of the data.

3. The device of claim 1, wherein the signature includes a plurality of malicious code portions, each of the plurality of malicious code portions corresponding to a different type of malicious code, and wherein the detector is to simultaneously detect the plurality of malicious code portions within the data.

4. The device of claim 1, wherein different malicious code portions are stored as the signature within the storage at different times and wherein the detector is to detect the different malicious code portions within the data at the different times.

5. The device of claim 1, wherein each byte of the signature comprises a malicious code byte to be detected within the data.

6. The device of claim 1, wherein each correlator is to provide a number of bytes of the data that have been matched to the signature and wherein the detector is to indicate that the malicious code has been detected within the data based on the number of bytes of the data that have been matched to the signature.

7. The device of claim 1, wherein all data entering the device is moved through the pipeline for processing and wherein the detector is to detect the malicious code within all the data entering the device.

8. A method comprising:
   moving data from one row to another row in a pipeline of a device to perform processing of the data; and
   detecting, by a hardware component of the device, a signature of malicious code within the data as the data is moving through the pipeline, including comparing the signature of the malicious code to the data in the pipeline,
   wherein detection of the signature of the malicious code within the data is in parallel with the processing of the data,
   wherein the signature includes a number of bytes greater than a total number of bytes in each row of the pipeline, and
   wherein each time the signature of the malicious code is compared to the data in the pipeline, the signature of the malicious code is compared to the data that spans more than one row of the pipe line.

9. The method of claim 8, wherein comparing the signature of the malicious code to the data comprises:
   simultaneously comparing the signature to each of a plurality of overlapping portions of the data, each overlapping portion beginning with a byte of the data at a different starting byte position within a given row of the pipeline.

10. The method of claim 9, further comprising:
indicating that the malicious code has been detected within the data based on a number of bytes of each overlapping portion of the data that have been matched to the signature.

11. A malicious code detector comprising:
a storage implemented in hardware to store a signature having a length of a number of bytes, the signature corresponding to one or more portions of malicious code to be detected within data moving through a pipeline; and
a plurality of correlators implemented in the hardware and equal in number to a total number of bytes of each row of a plurality of rows of the pipeline,
wherein the plurality of correlators are to compare the signature to the data in the pipeline to detect the malicious code,
wherein each time one of the plurality of correlators compares the signature to the data in the pipeline, the correlator is to compare the signature to the data that spans more than one row of the pipeline,
wherein each correlator is to provide a number of bytes of the data that have been matched to the signature, each correlator having an offset to detect the signature beginning at a different starting byte position of data within a given row of the pipeline, and
wherein the malicious code is indicated as having been detected within the data based on the number of bytes of the data that have been matched to the signature by each correlator.

12. The malicious code detector of claim 11, wherein the signature includes a plurality of malicious code portions, each of the plurality of malicious code portions corresponding to a different type of malicious code, and wherein the correlators are to simultaneously detect the malicious code portions within the data.

13. The malicious code detector of claim 11, wherein different malicious code portions are stored as the signature within the storage at different times and wherein the correlators are to detect the different malicious code portions within the data at the different times.

14. The malicious code detector of claim 11, wherein each byte of the signature comprises a malicious code byte to be detected within the data.

* * * * *